United States Patent [19]

Ward

[11] Patent Number: 5,583,085
[45] Date of Patent: *Dec. 10, 1996

[54] PREPARATION OF DEHYDROXYLATED SUPPORTS

[75] Inventor: David G. Ward, Laurel, Md.

[73] Assignee: W. R. Grace & Co.-Conn., New York, N.Y.

[*] Notice: The term of this patent shall not extend beyond the expiration date of Pat. No. 5,391,531.

[21] Appl. No.: 331,438

[22] Filed: Oct. 31, 1994

Related U.S. Application Data

[63] Continuation-in-part of Ser. No. 258,396, Jun. 13, 1994, Pat. No. 5,391,531.

[51] Int. Cl.$^6$ ........................................ B01J 21/00
[52] U.S. Cl. .................. 502/232; 502/208; 502/176; 502/236; 502/242; 502/251; 502/506
[58] Field of Search ........................ 502/208, 232, 502/176, 236, 242, 251, 506

[56] References Cited

U.S. PATENT DOCUMENTS 4,056,668  11/1977  Berger et al. ........................ 526/124
4,593,079  6/1986  Rekers et al. ........................ 326/100

FOREIGN PATENT DOCUMENTS 0371664  11/1989  European Pat. Off. .
0478076  9/1991  European Pat. Off. .
9102009  2/1991  WIPO .

OTHER PUBLICATIONS

Ono, Y. et al. Chem. Mater. 5, 442 (1993).

*Primary Examiner*—Asok Pal
*Assistant Examiner*—Bekir L. Yildirim
*Attorney, Agent, or Firm*—Mary Ann Capria

[57] ABSTRACT

Dehydroxylated oxide (e.g. silica) particles are obtained by reacting oxide particles, having surface hydroxyl groups, with a dialkylcarbonate or diarylcarbonate. The resulting products have surface alkoxy or aryloxy groups and significantly reduced hydroxyl content. The treated oxide particles are especially suitable for use as catalyst supports, and especially as polyolefin catalyst supports.

15 Claims, No Drawings

PREPARATION OF DEHYDROXYLATED SUPPORTS

This case is a continuation-in-part of U.S. patent application Ser. No. 08/258,396 filed on Jun. 13, 1994, U.S. Pat. No. 5,391,531.

BACKGROUND OF THE INVENTION

In the field of oxide-supported catalysts, in general, and especially for olefin polymerization catalysts, it is often desired to remove surface hydroxyl groups from the oxide support particles before and/or during manufacture of the supported catalyst.

In the past, various thermal and/or chemical treatments have been used in an effort to achieve dehydroxylation of the oxide particles.

Thermal treatments (i.e. calcining) are advantageous from the point that they do not add undesirable chemicals to the support and that they are relatively simple inexpensive processes. Unfortunately, thermal treatments are often ineffective for achieving a high degree of dehydroxylation. Further, for many porous oxide supports (e.g., silica gel), thermal treatments often result in an undesirable loss of pore volume, shrinkage of the pores and/or loss of surface area.

A variety of chemical treatments have been attempted. Many types of chemicals have been used such as organo aluminum compounds, magnesium chloride/dehydrating agent combinations, organosilanes, halosilanes, silazanes, etc. These various chemical processes are often expensive and may result in the addition of undesired or complicating constituents to the oxide support.

Thus, there remains a need for improved techniques for dehydroxylation and improved dehydroxylated supports.

SUMMARY OF THE INVENTION

The invention provides dehydroxylated oxide supports having unique and simplified surface chemical composition. The invention further provides improved methods for forming dehydroxylated oxide supports.

In one aspect, the invention encompasses porous dehydroxylated oxide particles wherein said silica comprises less than 10 millimoles (mmol) surface hydroxyl groups per gram of oxide and wherein said silica comprises alkoxy and/or aryloxy groups on its surface. Preferably, the oxide particles are silica-containing particles more preferably silica gels.

In another aspect, the invention encompasses a method of removing hydroxyl groups from the surface of an oxide particle, the method comprising:

(a) contacting the hydroxyl-containing oxide with a carbonate selected from the group consisting of dialkylcarbonates, diarylcarbonates and mixtures thereof and a base to form a mixture, (b) heating the mixture whereby the hydroxyl-containing oxide and carbonate react to eliminate at least a portion of the hydroxyl groups and to form alkoxy or aryloxy groups on the surface of the oxide, (c) recovering the dehydroxylated oxide formed in step (b).

Preferably, the reaction is carried out in a non-aqueous environment. If desired, the dehydroxylated support may be further treated to form a desired chemical configuration on the oxide surface and/or to place a desired catalyst on the support.

These and other aspects of the invention will be described in further detail below.

DETAILED DESCRIPTION OF THE INVENTION

The invention broadly encompasses dehydroxylated oxide particles characterized by very low surface hydroxyl content and by the presence of alkoxy and/or aryloxy groups on the particle surface. If desired, the alkoxy and/or aryloxy groups may be further reacted with other chemicals.

The oxide particles of the invention may be virtually any refractory metal or silicon oxide. Preferably, the oxide composition is one conventionally used as a catalyst support material. It is also preferred that the oxide particles be porous. Preferred oxides are silica, alumina, aluminum phosphate, silica alumina, titania, silica titania, silica titania alumina, magnesia, silica magnesia and mixtures thereof. The oxide particles are preferably amorphous particles such as amorphous precipitates or amorphous gels. Amorphous silicas and supports based on amorphous silica are most preferred.

The hydroxyl content of the oxide particles may be measured by any known suitable technique. Preferably, a spectral analysis method such as DRIFTS is used. The hydroxyl content of the dehydroxylated product may vary depending on the initial hydroxyl content, the desired degree of dehydroxylation, etc. Preferably, the hydroxyl content is less than 10 mmol per gram of oxide, more preferably less than 1 mmol/g. Most preferably, the oxide is completely free of hydroxyl groups on its surface.

The degree of porosity in the dehydroxylated oxide may be any level that is achievable in the starting hydroxyl-containing oxide. Preferably, the dehydroxylated oxide particles have a pore volume of at least 0.3 cc/g. More preferably, the pore volume exceeds 1 cc/g. Similarly, the surface area of the dehydroxylated oxide particles can be any level that is achievable in the starting hydroxyl-containing oxide. Preferably, the dehydroxylated oxide particles have a surface area of about 50–1000 $m^2/g$.

The alkoxy and/or aryloxy groups on the oxide particle surface are believed to be substituted for at least some of the hydroxyl groups on the surface of the oxide particles. The net effect of the substitution is to replace the hydrogen of the hydroxyl group with an alkyl or aryl group (i.e., —OH being replaced by —OR where R is an alkyl or aryl group). Preferred alkyl groups are selected from the group consisting of methyl, ethyl, propyl and mixtures thereof. In principle, other alkyls may also be used. A preferred aryl group is phenyl, however other substituted aryl groups may also be employed. The total amount of alkyl (alkoxy) and/or aryl (aryloxy) groups on the oxide surface is dependent on the number of hydroxyl groups present on the oxide to be treated. The amount of alkoxy or aryloxy groups is typically about 10 mmol/g or less (but greater than zero), more typically about (0.1–3 mmol/g).

The invention further encompasses methods for forming dehydroxylated oxide particles. The methods of the invention generally encompass a step where hydroxyl-containing oxide particles are reacted with a dialkylcarbonate or diarylcarbonate in the presence of a base whereby at least a portion of the hydroxyl groups are removed or eliminated and alkoxy or aryloxy groups are formed on the oxide particle surface.

The methods preferably involve formation of an initial mixture containing the oxide particles (to be dehydroxylated), the dialkylcarbonate or diarylcarbonate, and a base. The initial mixture preferably also contains a solvent (preferably non-aqueous) however, neat mixtures of the oxide particles, carbonate and base may be used. The ingredients forming the initial mixture may be combined in virtually any desired sequence.

The oxide particles to be treated may be any hydroxyl-containing oxide. Preferably, the oxide particles are selected from those described above regarding the product of the invention. The particles may contain any level of hydroxyl content. While the particles may contain some free water, it is preferred that any free water be removed before the initial mixture is formed. (e.g., by solvent exchange or heating to less than 800° C.) The oxide particles are preferably porous. The porosity of the particles is preferably dictated by the intended end use of the particles. Preferably, the porosity of the particles to be dehydroxylated is such that the resulting oxide particles would be suitable for use as polyolefin catalyst supports.

The dialkylcarbonate may be any such carbonate capable of performing the dehydroxylating function. Preferably, the dialkylcarbonate comprises alkyl groups selected from the group consisting of methyl, ethyl, propyl and mixtures thereof, however higher alkyls may be used. Preferably, the alkyl groups in the dialkylcarbonate consist essentially of $C_1$–$C_3$ alkyls, e.g., dimethylcarbonate, diethylcarbonate, methylethyl carbonate, diphenylcarbonate and mixtures thereof (dimethylcarbonate being most preferred). The diarylcarbonate may be any such carbonate capable of performing the dehydroxylating functions. Preferred diarylcarbonate is diphenylcarbonate. The amount of dialkylcarbonate and/or diarylcarbonate used may be varied depending on factors such as the hydroxyl content of the initial oxide particles, the desired degree of dehydroxylation, the reaction conditions, etc. Preferably, about 1–15 mmol of dialkylcarbonate and/or diarylcarbonate are used per mole of hydroxyl groups contained in the oxide particles.

The dehydroxylation reaction is preferably conducted in the presence of a base which is believed to catalyze the dehydroxylation. The base is preferably one which can be easily removed after the reaction has taken place. In any event, it is preferred that the base be selected to provide minimal or no deleterious effect on the resulting properties of the dehydroxylated oxide particles. Mineral bases such as alkali metal hydroxides may be employed, however preferred bases are amine-containing bases such as triethylamine (TEA) tributylamine (TBA), ammonia, n-butyllithium, dimethylamine (DBA), anilines, tertiary amines and mixtures thereof. The amount of base used may be varied depending on the desired rate of reaction. The amount of base added is preferably about 0.1–10 mmol per gram of oxide particles more preferably about 1–5 mmol per gram.

The initial mixture preferably contains a solvent to facilitate mixing, etc. The solvent is preferably a non-aqueous solvent. Organic solvents such as hexane, tetrahydrofuran, toluene, ether and heptane and mixtures thereof are generally preferred. The amount of solvent used is not critical, but amounts in excess of that needed to form a pourable slurry are generally unnecessary.

Once the initial mixture is formed, it is then reacted to cause the dehydroxylation. If desired, the mixture may be heated to about 30°–150° C. to facilitate the reaction. The solvent is preferably refluxed during the heating using any conventional refluxing technique. The reaction is preferably conducted in a substantially dry atmosphere. Inert gas atmospheres such as dry argon are preferred. The required reaction time may vary depending on the composition of the mixture, the temperature used, the desired degree of dehydroxylation, etc. Typical reaction times are about 1–24 hours.

While the dehydroxylation can generally be completed in a single reaction step, it is possible to repeat the dehydroxylation reaction step by recovering the oxide particles and forming a new reaction mixture in the same manner as for the formation of the initial mixture.

Once the desired dehydroxylation has been accomplished, the dehydroxylated particles may be recovered from the mixture. Preferably, recovery can be accomplished by simply evaporating the solvent and other reactants. In some instances, it may be desirable to wash the dehydroxylated oxide with a solvent to further move any residual reactants, etc. Preferably, however, the reactants are selected such that they are all removable by volatilization. Preferably, the removal is conducted under at least a partial vacuum. If desired, techniques such as spray drying may be employed.

The dehydroxylated product will typically be in the form of a free flowing powder having the alkoxy and/or aryloxy surface groups corresponding to the alkylcarbonate and/or arylcarbonate used in the reacting step. The recovered product may be further treated as desired to place a catalyst or other constituents on its surface.

The invention is further illustrated by the following examples. It should be understood that the invention is not limited to the specific details of the examples.

EXAMPLE 1

A round bottom flask was loaded with 30 g silica gel (Grace Davison 948) which had been calcined at 400° C. for two hours. 250 ml of hexane and 34 mmol of tributylamine were added to the flask, and the mixture was stirred for two hours at room temperature to form a slurry. 360 mmol of dimethyl carbonate was then added to the slurry. The slurry was then allowed to react at room temperature (25° C.) for about 24 hours. The reacted slurry was then dried under vacuum and the treated silica was examined by infrared (IR) spectroscopy. The IR analysis indicated that substantially all the silanol (hydroxyl) groups present on the untreated silica had been removed and that methoxy groups were present on the surface of the treated silica. No traces of amine on the treated silica.

EXAMPLE 2

The procedure of Example i was repeated except that 68 mmol of tributylamine were used, and 360 mmol diethyl carbonate were used instead of the dimethyl carbonate. The IR analysis of the treated silica indicated that substantially all the silanol groups present on the untreated silica had been removed and that ethoxy groups were present on the surface of the treated silica. No traces of amine on the treated silica.

EXAMPLE 3

The procedure of Example 1 was repeated except that 34 mmol of n-butyllithium were used instead of the tributylamine. The IR analysis of the treated silica indicated that substantially all the silanol groups present on the untreated silica had been removed and that methoxy groups were present on the surface of the treated silica.

What is claimed is:

1. Porous dehydroxylated oxide particles wherein said oxide comprises less than 10 millimoles of surface hydroxyl groups per gram of said oxide and wherein said oxide is selected from the group consisting of titania, silica titania alumina, magnesia, silica magnesia, and mixtures thereof.

2. The dehydroxylated silica of claim 1 wherein said silica has a surface area of about 50–1000 $m^2/g$ and a pore volume of at least 0.3 cc/g.

3. A method of removing hydroxyl groups from the surface of an oxide particle selected from the group consisting of titania, silica titania alumina, magnesia, silica magnesia, and mixtures thereof, said method comprising the steps of:

(a) contacting said hydroxyl-containing oxide with a carbonate selected from the group consisting of dialkylcarbonates, diarylcarbonates and mixtures thereof and a base to from a mixture, whereby said hydroxyl-containing oxide and said carbonate react to eliminate at least a portion of said hydroxyl groups and to form alkyoxy and/or aryloxy groups on the surface of said oxide, and (b) recovering the dehydroxylated oxide formed in step (a).

4. The method of claim 3, the method further comprising contacting said hydroxyl-containing oxide with a solution of said carbonate and said base in solvent.

5. The method of claim 4, the method further comprising a solution of said carbonate and said base in a non-aqueous solvent.

6. The method of claim 3, the method further comprising selecting said carbonate from the group consisting of dimethylcarbonate, diethylcarbonate, methylethylcarbonate, diphenylcarbonate and mixtures thereof.

7. The method of claim 3, the method further comprising selecting said base from the group consisting of alkali metal hydroxides, tertiary amines, anilines, n-butyllithium and mixtures thereof.

8. The method of claim 5, the method further comprising selecting said solvent from the group consisting of hexane, heptane, toluene, ether, tetrahydrofuran, and mixtures thereof.

9. The method of claim 4, the method further comprising heating said mixture from step (a).

10. The method of claim 9, the method further comprising heating said mixture from step (a) to about 30°–150° C.

11. The method of claim 4, the method further comprising the step of removing said solvent by evaporation in step (b).

12. The method of claim 9, the method further comprising washing said dehydroxylated oxide with a solvent after heating.

13. The method of claim 10, the method further comprising heating said mixture in an inert atmosphere.

14. The method of claim 9, the method further comprising refluxing the solvent during heating.

15. The method of claim 3, the method further comprising treating said hydroxyl-containing oxide prior to step (a) to remove any free water contained therein.

* * * * *